June 24, 1930.  H. L. POWER  1,767,013
UNLOADING DEVICE
Filed Sept. 1, 1928  3 Sheets-Sheet 3
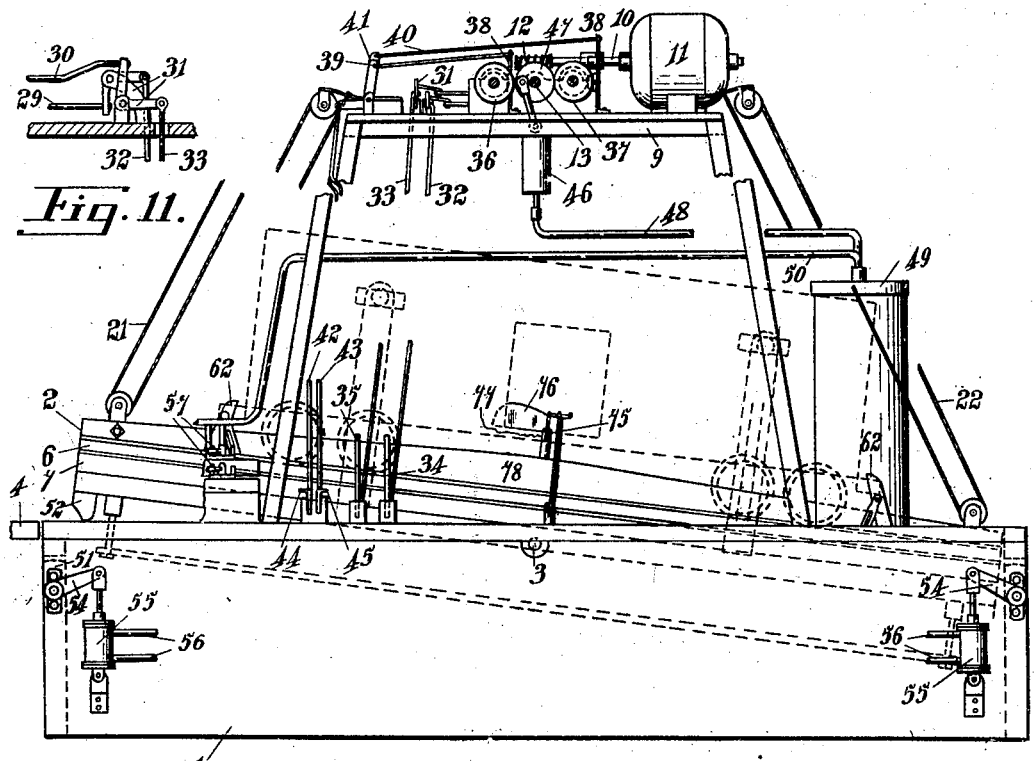
Fig. 11.
Fig. 4.
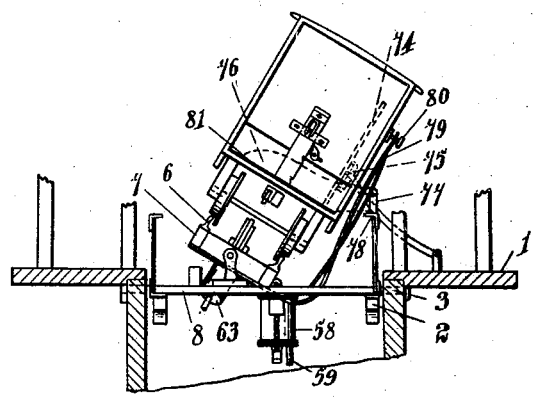
Fig. 5.
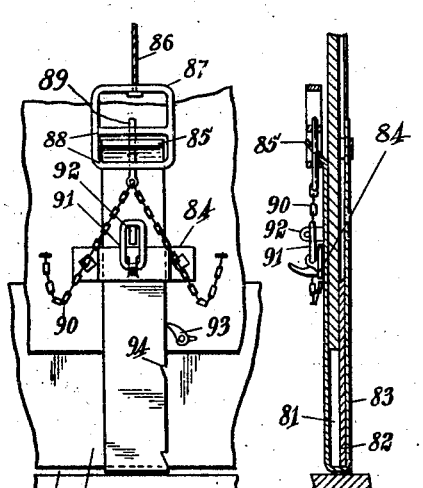
Fig. 6. Fig. 7.
Inventor
H. L. Power
by J. Edw. Maybee
ATTY.

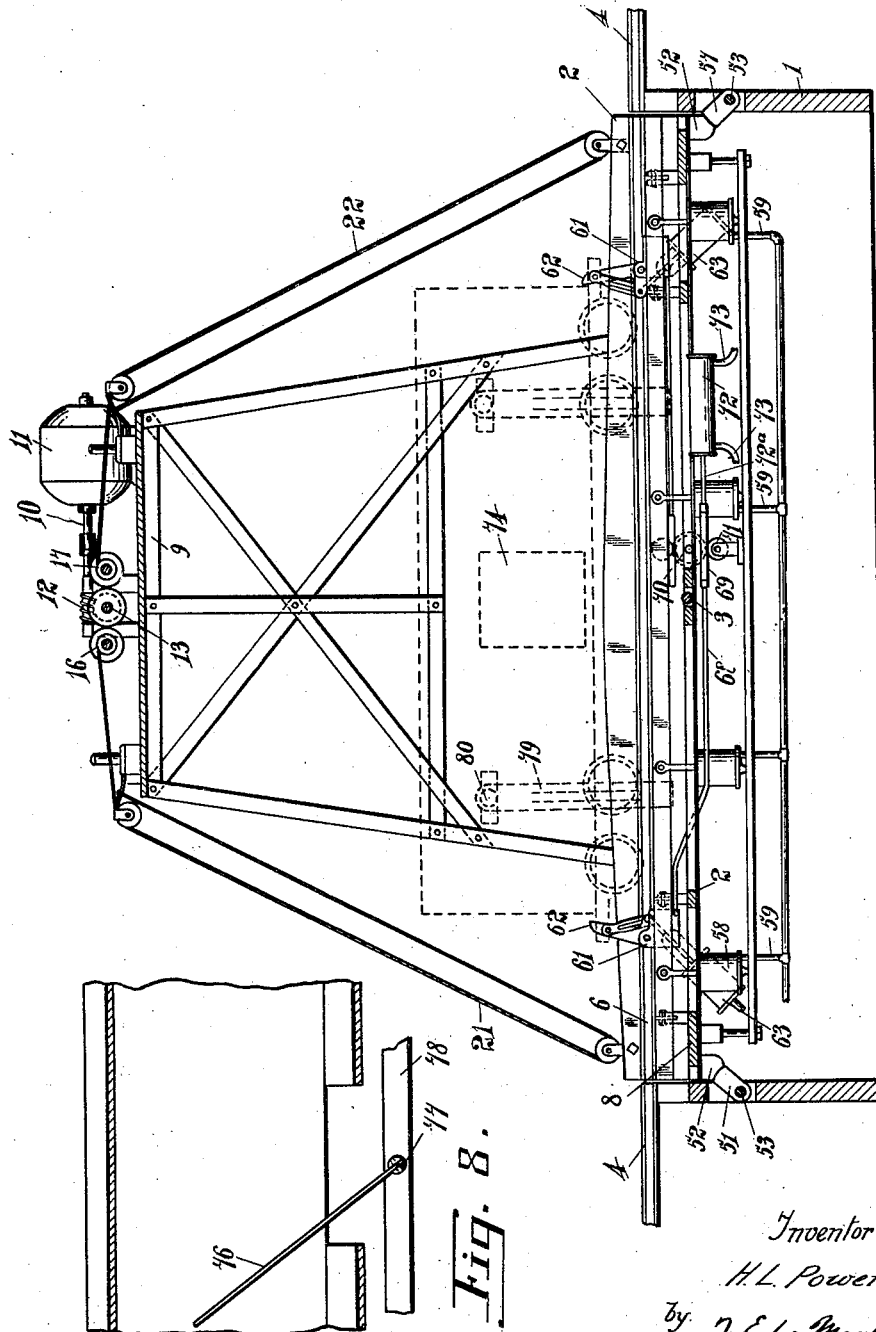

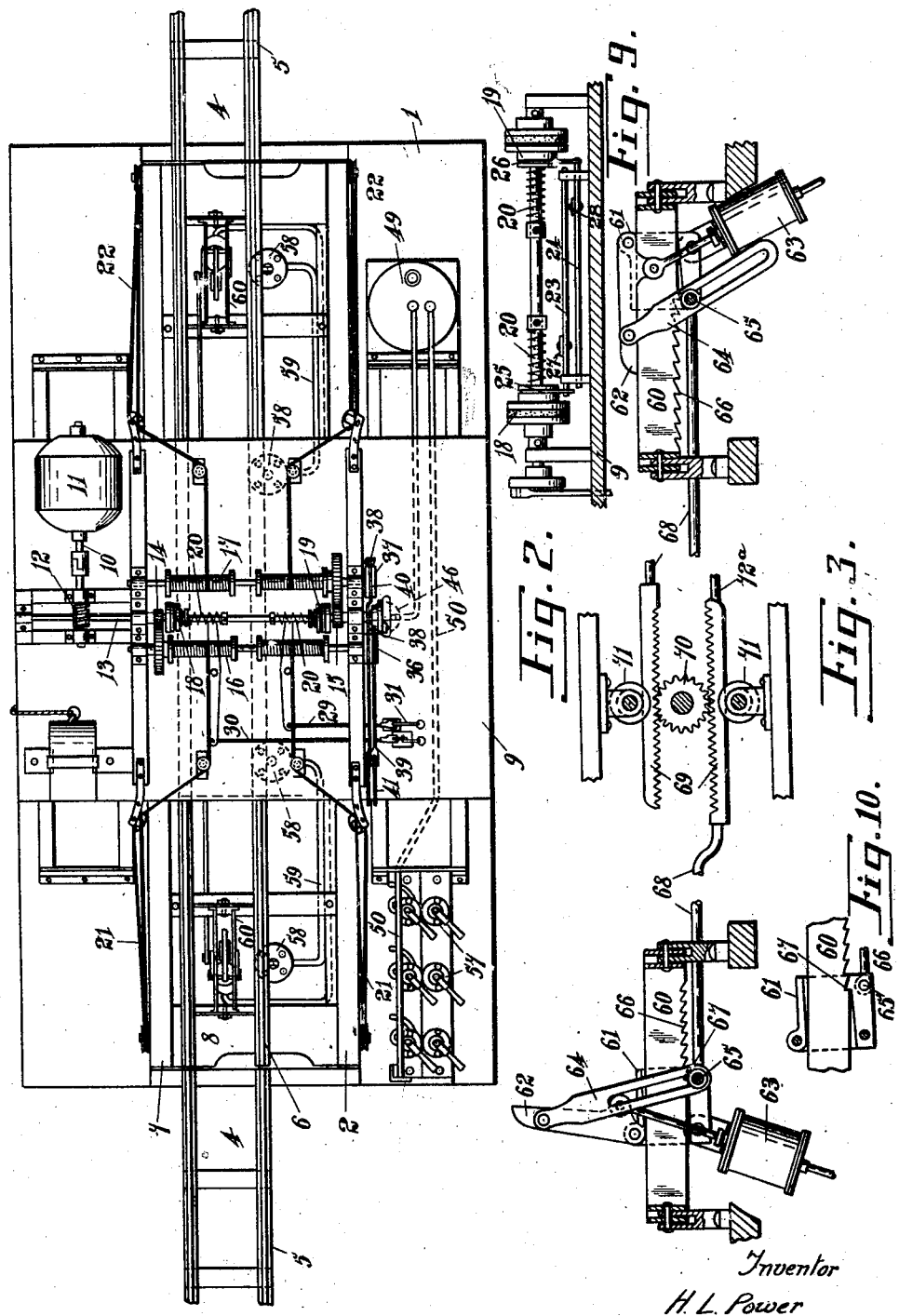

Patented June 24, 1930

1,767,013

UNITED STATES PATENT OFFICE

HENRY L. POWER, OF BRANDON, MANITOBA, CANADA

UNLOADING DEVICE

Application filed September 1, 1928. Serial No. 303,519.

This invention relates to devices for unloading wheeled vehicles, and more particularly railway rolling stock such as used for carrying grain. It has been proposed to use for this purpose a tilting platform onto which a car may be run, and which is adapted to tilt the car both endwise and crosswise, and one of my objects is to improve the constructions used for this purpose to facilitate the handling of the cars. A further object is to improve the car construction so that the cars may be unloaded on a simplified form of the device.

I attain my objects by means of the constructions hereinafter described and illustrated in the accompanying drawings in which Fig. 1 is a side elevation, partly in section, of my device;

Fig. 2 a plan view of the same;

Fig. 3 a detail, partly in side elevation and partly in section, of the means for locking the car on the tilting platform;

Fig. 4 a side elevation, partly broken away, showing the platform tilted;

Fig. 5 a cross section of part of the apparatus showing a box car tilted sidewise;

Fig. 6 an end view of part of a box car illustrating the end door;

Fig. 7 a vertical section of the same;

Fig. 8 a horizontal section of part of a box car tilted to show the operation of the discharging wing;

Fig. 9 a side elevation of part of the hoisting mechanism for tilting the platform endwise;

Fig. 10 a detail of one of the slides and guides of the car locking mechanism; and Fig. 11 a detail of the bell crank mechanism operating clutches.

In the drawings like numerals of reference indicate corresponding parts in the different figures.

1 is the base framework of the apparatus, which in practice will be mounted above suitable bins or hoppers for the unloaded material. On this base is mounted the platform 2, which is pivotally mounted at 3. Extending from the base at each side are the runways 4, on which freight cars may be run to and from the device. The runways are provided with the rails 5, which, when the platform 2 is horizontal, are in alinement with the rails 6 of the platform. The rails 6 are mounted on the frame 7, which is provided with cross members pivoted on the bars 8 supported by the platform 2. The frame carrying the rails 6 may thus be tilted sidewise as shown in Fig. 5.

The main operating mechanism is supported on the overhead platform 9 supported from the base 1. On this platform is journalled the main drive shaft 10, which is shown as connected with an electric motor 11, though other means of driving it may. o course, be employed. This driving shaft by means of work gearing 12, drives the shaft 13, which, by means of the gearing 14 and 15, drives the winding drums 16, 17, respectively, according as the clutches 18 or 19 are engaged. Normally both clutches are held in by the coil springs 20. By means of the hoisting cables 21, 22 carried round suitable guide pulleys, the hoisting drums are adapted to tilt the platform 2 on its pivot 3, as indicated in Fig. 4.

The clutch actuating mechanism is illustrated more particularly in Fig. 9. Sliding shifters 23, 24 are mounted on the platform 9, which are provided with forked arms engaging the grooved collars 25, 26, respectively, of the clutches 18, 19. The shifters are pivotally connected with the ends of the shifter levers 27, 28 fulcrumed intermediate of their ends of the platform 9. The other ends of the shifter levers are connected by means of the connecting rods 29, 30 with bell cranks 31, which, by means of the connecting rods 32, 33 are connected with hand levers 34, 35, by means of which the clutches may be actuated.

Brake drums 36, 37 are provided on the shafts of the hoisting drums 16, 17, against which bear the brake shoes 38 shown as spring arms adapted to press against the drums. These brake shoes are actuated by the connecting rods 39, 40, the other ends of which are each connected with one of the bell crank levers 41. These levers are connected by means of the connecting rods 42, 43 with the pedals 44, 45. Thus by means of the hand levers 34, 35 and the pedals 44, 45 the operator may control the endwise tilting of the platform 2.

The rest of the operation of the device is pneumatically effected; that is, the locking of the platform 2 in a horizontal position, the locking of the car on the platform against endwise motion, the lateral tilting of the frame 7 and rails 6.

While the air supply may be obtained in any convenient manner, I show for this purpose an air pump 46 mounted below the platform 9. The connecting rod of this air pump is connected with a crank disk 47 on the shaft 13. From the air pump a pipe 48 leads to the storage tank 49, from which a pipe 50 leads to the various control valves 57 shown at the left hand side of Fig. 2. These valves control the air supply to the various pneumatic cylinders, hereinafter referred to, in a well known manner, and are therefore not described or illustrated in detail.

The locking of the platform 2 against endwise tilting is effected by means of the latches 51, which are adapted to engage shoulders 52 on the platform 2. These latches are secured to shafts 53 journalled on the base 1, which shafts are provided with lock arms 54 adapted to be actuated by the pneumatic cylinders 55, to which lead the pipes 56 controlled by two of the valves 57.

The sidewise tilting of the frame 7 is effected by means of a plurality of pneumatic cylinders 58 mounted on the platform 2, their piston rods being pivotally connected with a longitudinal member of the frame. To these cylinders are connected the pipes 59 which will be led to and controlled by one of the valves 57.

The end locks which hold the cars from endwise movement when on the platform 2 are arranged as follows. Two similar locks are employed, one adjacent each end of the platform 2 and, as these are similar in every respect, a detailed description of one would apply equally to the other. These locks are arranged that lock arms may be projected upwardly for engagement with the car independently of one another, and means is also provided for simultaneously moving them to or from one another whether the lock arms are projected or retracted. Each lock includes a guide 60 arranged longitudinally of the platform 2, preferably comprising parallel bars. On each guide is fitted a slide 61. On the upper part of the slide is hinged a lock arm 62 (see particularly Fig. 3) adapted to be projected upwardly, as shown at the left hand side of Fig. 3, or to be drawn down to a horizontal position, as shown at the right hand side of Fig. 3. Pivotally mounted on the slide is a pneumatic cylinder 63, the piston rod of which is pivotally connected to the lock arm at one side of the line intersecting the face of its car engaging end and its pivotal connection with the slide. A link 64 is pivotally connected with the arm adjacent its free end and is slotted to embrace the pin 65 located at the underside of the slide. This link thus serves to limit the upward swing of the lock arm and thus takes the strain of the piston rod off the cylinder 63. It also serves another purpose as will hereinafter appear.

It will be noted on reference to Figs. 3 and 10 that the slide 61 is so mounted on the guide 60 that it may rock in a vertical plane. The underside of the members of the guide 60 are formed with ratchet teeth 66 and on parts of the slide are formed teeth 67 adapted to engage the teeth 66, as shown in Fig. 10. Normally the teeth 67 and 66 are not in engagement and will remain out of engagement until the pressure of a car is exerted against the end of the lock arm 62 when the latter is projected. The slide then is tilted and the teeth engaged to lock the slide to the guide. The locks are moved to and from one another by means of the rack rods 68, the ends of which are pivotally connected with the pins 65 of the locks. The rack rods are provided with the racks 69 engaging the opposite sides of the pinion 70, the racks being held in engagement with the pinion by the roller guides 71. One of the racks is connected with the piston rod 72ª of the pneumatic cylinder 72 secured to and beneath the platform 2. The pipes 73 supply the cylinder 72 and are controlled by one of the valves 57.

The mode of operation of the parts so far described is substantially as follows. The platform 2 is locked as shown in Fig. 1, and through the medium of the cylinder 72 the end locks for the car are moved apart as far as may be necessary and a car is then run onto the platform 2 from one of the runways 4 until it engages the appropriate lock which has been raised through the medium of its cylinder 63. The other end lock is then raised and the locks drawn together to firmly engage the upper ends of the lock arms 62 with suitable parts of the car, preferably the coupler heads. The frame 7 is now tilted, as shown in Fig. 5, through the medium of the pneumatic cylinders 58. Assuming the side door 74 of the car to be open, most of the grain in the car will run out through the doorway to any suitably arranged bin. If an inside door is employed opening inwardly, the door may be opened automatically through the medium of the abutment member 75, which is pivoted on the base 1 so that it may be swung into a position to engage the door 74, as shown in Fig. 5, pushing it inward as the car tilts sidewise. After most of the grain is run out, the door is easily removed, and the grain remaining in the ends of the car is emptied out in the following manner and by the air of the wing 76, which is mounted on the pivot 77, which turns in one of the side members of the platform 2, the wing itself being hinged on the pivot to swing in a vertical plane. The wing may thus be swung into the doorway of the car, as shown in Fig. 8, and inclined either to the left or right. The emptying of the car may then be completed by tilting it endwise first, in one direction, and then in the other, the position of the wing being changed as required to guide through the doorway the grain sliding down from the high end of the car. When the car is empty, one of the lock arms 62 is lowered and the pneumatic cylinder 72 caused to draw the locks towards one another. One of them being down and out of the way, the movement of the other is imparted to the car to cause it to move off the platform 2 onto one of the runways. The series of operations already described may then be repeated with another car.

It is necessary, when the car is tilted sidewise to prevent its tipping sidewise of the rails 6. I therefore provide the frame 7 with the upwardly extending arms 79, preferably resilient, which are adapted to be engaged by the upper part of a box car, as shown in Fig. 5. Preferably the engagement is through the medium of the adjustable screws 80, which adapt the device for use with box cars of various dimensions.

While my apparatus in complete form will satisfactorily unload the ordinary type of car with side door, the mechanism for handling the cars may be much simplified if the cars to be handled are provided with end doors. Under these conditions it is merely necessary to provide means for tilting the car endwise.

In Figs. 5, 6 and 7 I show a car with an opening 81 in its end. This opening is normally closed by the door 82 sliding against the inner face of the end of the car. Unloading is facilitated if means are provided for automatically opening this door when the car is tilted endwise. For this purpose I provide the following construction. A strap 83 embraces the door and extends up both outside and inside the end of the car sliding through the guides 84. The upper outer end of this strap is formed with an outwardly extending lug 85 forming a draft connection.

A cable 86 is provided at one end with a connecting member 87 formed as a frame, to the upper end of which the cable is connected. This frame includes two cross bars 88, and in these cross bars are formed holes adapted to be alined with a hole formed in the lug 85. A pin 89 is passed through the alined holes, as shown in Figs. 6 and 7, frictionally engaging therein so that it is not readily dislodgable. A chain or chains 90 normally slack, as shown, are connected to this pin and the car end. The other end of the cable is preferably connected with an overhead stationary part. As soon as the car is tilted endwise, the cable 86 becomes taut and raises the door 82 through the medium of the strap 83. The chains 90 are drawn taut before the door is fully opened and thus the pin is withdrawn at or about the time the door is wide open. The connecting member 87 then becomes disconnected enabling the car to be tipped as far as may be necessary without damage to the door opening mechanism. The outside guide 84 is provided with a latch 91, which may be engaged over an eye 92 to provide a lock and seal attaching means for the door. A dog 93 carried on the end of the car is adapted to engage the notch 94 on the strap 83 to hold the door in its fully open position.

The provision of end doors not only simplifies the unloading mechanism, but also enables the operation of unloading to be performed much more quickly than is possible when the side doorway must be used as a discharge opening.

It will be understood, of course, that various modifications of the door-opening construction are possible which would fall within the scope of my invention.

What I claim as my invention is:

1. A car having an opening in one end; a door controlling said opening; a draft connection on the door; a cable connecting member adapted to releasably engage the draft connection; a retaining member normally holding the cable connecting member in engagement with the draft connection; and means for disengaging the retaining member by the relative movement of the door and car end.

2. A car having an opening in one end; a door controlling said opening; a draft connection on the door having a hole therein; a cable connecting member having spaced parts formed with holes adapted to be alined with the hole in the draft connection; a pin adapted to be inserted in said holes; and a normally slack connection between the pin and the car end.

3. In unloading apparatus, the combination of a tiltable platform onto which a car may be run; a car having a door controlled opening in one end; a stop on the platform limiting the movement of the car on the platform towards the end adjacent said opening; means for tilting the platform; means for automatically opening the door as the platform is tilted comprising a stationary part, a draft connection between the stationary part and the door formed in two parts, a connection between the parts, and means for releasing said connection operable by relative movement of the door and end.

Signed at Toronto, Canada, this 22nd day of August, 1928.

H. L. POWER.